(12) United States Patent
Freking et al.

(10) Patent No.: US 7,339,635 B2
(45) Date of Patent: Mar. 4, 2008

(54) PRE-STACKED OPTICAL FILMS WITH ADHESIVE LAYER

(75) Inventors: Anthony J. Freking, Vadnais Heights, MN (US); Patrick H. Marushin, St. Paul, MN (US); Keith M. Kotchick, St. Paul, MN (US); Michael L. Ruegsegger, Mahtomedi, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 462 days.

(21) Appl. No.: 11/036,521

(22) Filed: Jan. 14, 2005

(65) Prior Publication Data

US 2006/0158592 A1    Jul. 20, 2006

(51) Int. Cl.
*G02F 1/1335* (2006.01)
(52) U.S. Cl. .................. 349/58; 349/64; 349/115; 359/513
(58) Field of Classification Search .............. 359/513; 349/58
See application file for complete search history.

(56) References Cited

U.S. PATENT DOCUMENTS

| | | | |
|---|---|---|---|
| 3,531,358 A * | 9/1970 | Hesselmann et al. ....... 156/475 |
| 3,754,813 A | 8/1973 | DePalma |
| 3,765,281 A | 10/1973 | Wolfe |
| 3,788,171 A | 1/1974 | Hoadley |
| 3,851,093 A | 11/1974 | Sunstein |
| RE29,091 E | 12/1976 | De Palma |
| 4,542,449 A | 9/1985 | Whitehead |
| 4,576,850 A | 3/1986 | Martens |
| 4,791,540 A | 12/1988 | Dreyer, Jr. |
| 4,804,253 A | 2/1989 | Stewart |
| 4,906,070 A | 3/1990 | Cobb, Jr. |
| 4,971,719 A | 11/1990 | Vaz et al. |
| 4,984,144 A | 1/1991 | Cobb, Jr. et al. |
| 5,005,108 A | 4/1991 | Pristash |
| 5,076,668 A | 12/1991 | Dalisa |
| 5,128,783 A | 7/1992 | Abileah |
| 5,146,415 A | 9/1992 | Faris |
| 5,161,041 A | 11/1992 | Abileah |
| 5,190,370 A | 3/1993 | Miller |
| 5,207,493 A | 5/1993 | Murase et al. |
| 5,247,390 A | 9/1993 | Hed |
| 5,268,782 A | 12/1993 | Wenz et al. |
| 5,280,371 A | 1/1994 | McCartney, Jr. |
| 5,394,255 A | 2/1995 | Yokota |
| 5,435,963 A | 7/1995 | Rackovan et al. |
| 5,467,208 A | 11/1995 | Kokawa |
| 5,492,590 A | 2/1996 | Sakai et al. |
| 5,521,797 A | 5/1996 | Kashima |
| 5,550,657 A | 8/1996 | Tanaka |
| 5,552,907 A | 9/1996 | Yokota |
| 5,592,332 A | 1/1997 | Nishio |

(Continued)

FOREIGN PATENT DOCUMENTS

DE         3407431         8/1985

(Continued)

Primary Examiner—Andrew Schechter (57) ABSTRACT

Pre-aligned optical layers are stacked and arranged such that an adhesive layer, which is stacked onto the optical layers, contacts at least the uppermost layer and lowermost layer. The resulting subassemblies can be assembled into an optical display without individual handling of the layers, which reduces installation time and manufacturing costs.

17 Claims, 8 Drawing Sheets

U.S. PATENT DOCUMENTS

| | | | |
|---|---|---|---|
| 5,596,429 | A | 1/1997 | Kokawa |
| 5,598,280 | A | 1/1997 | Nishio |
| 5,600,455 | A | 2/1997 | Ishikawa |
| 5,600,462 | A | 2/1997 | Suzuki |
| 5,627,926 | A | 5/1997 | Nakamura |
| 5,659,408 | A | 8/1997 | Wenyon |
| 5,748,269 | A | 5/1998 | Harris et al. |
| 5,767,931 | A | 6/1998 | Paczkowski |
| 5,771,328 | A | 6/1998 | Wortman |
| 5,828,488 | A | 10/1998 | Ouderkirk et al. |
| 5,868,892 | A | 2/1999 | Klima, Jr. |
| 5,919,551 | A | 7/1999 | Cobb, Jr. |
| 5,997,964 | A | 12/1999 | Klima, Jr. |
| 6,052,164 | A | 4/2000 | Cobb, Jr. |
| 6,079,840 | A | 6/2000 | Ono et al. |
| 6,104,854 | A | 8/2000 | Masaki |
| 6,185,043 | B1 | 2/2001 | Imamura |
| 6,191,833 | B1 | 2/2001 | Hirakata |
| 6,219,127 | B1 * | 4/2001 | Hirakata et al. ............ 349/153 |
| 6,322,236 | B1 | 11/2001 | Campbell |
| 6,364,497 | B1 | 4/2002 | Park et al. |
| 6,411,353 | B1 | 6/2002 | Yarita et al. |
| 6,462,794 | B1 | 10/2002 | Yoshikawa et al. |
| 6,502,945 | B2 * | 1/2003 | Kim et al. .................... 362/27 |
| 6,538,709 | B1 * | 3/2003 | Kurihara et al. .............. 349/58 |
| RE38,243 | E | 9/2003 | Oe et al. |
| 6,613,421 | B2 | 9/2003 | Jonza et al. |
| 6,661,482 | B2 | 12/2003 | Hara |
| 6,661,487 | B2 | 12/2003 | Takahashi et al. |
| 6,685,795 | B1 | 2/2004 | Braun |
| 6,708,595 | B1 * | 3/2004 | Chaussade et al. ........ 89/36.02 |
| 6,891,580 | B2 * | 5/2005 | Jang et al. .................... 349/58 |
| 6,913,365 | B2 | 7/2005 | Masaki |
| 7,147,358 | B2 | 12/2006 | Freking et al. |
| 2002/0080598 | A1 | 6/2002 | Parker et al. |
| 2002/0124950 | A1 | 9/2002 | Klima |
| 2002/0149712 | A1 | 10/2002 | Kitamura et al. |
| 2002/0196397 | A1 | 12/2002 | Takahashi et al. |
| 2003/0063251 | A1 | 4/2003 | Murata et al. |
| 2003/0133207 | A1 | 7/2003 | Minami et al. |
| 2004/0150874 | A1 | 8/2004 | Suzuki |
| 2005/0046767 | A1 | 3/2005 | Freking et al. |
| 2005/0238852 | A1 | 10/2005 | Nakayama et al. |
| 2006/0108050 | A1 | 5/2006 | Satake et al. |

FOREIGN PATENT DOCUMENTS

| | | |
|---|---|---|
| EP | 0395957 | 11/1990 |
| EP | 0 531 939 | 3/1993 |
| EP | 0 770 899 | 5/1997 |
| EP | 1134068 | 9/2001 |
| EP | 1168282 A | 1/2002 |
| EP | 1220014 | 7/2002 |
| EP | 1302922 | 4/2003 |
| EP | 1 496 376 | 1/2005 |
| JP | 06-18707 | 1/1994 |
| JP | HEI-6-342106 | 12/1994 |
| JP | 07043713 A | 2/1995 |
| JP | 07-78254 | 3/1995 |
| JP | 08248209 | 3/1995 |
| JP | 09-267424 | 10/1997 |
| JP | 11259021 | 9/1999 |
| JP | 2001301104 A | 10/2001 |
| JP | 2002304254 A | 10/2002 |
| JP | 2003-207767 | 7/2003 |
| KR | 1019970007399 | 2/1997 |
| WO | WO 9527919 | 10/1995 |
| WO | WO 96/27757 | 9/1996 |
| WO | WO 97-28468 | 8/1997 |
| WO | WO 0150160 | 7/2001 |
| WO | WO 0221167 A | 3/2002 |
| WO | WO 03010569 | 2/2003 |
| WO | WO 03/042747 | 5/2003 |
| WO | WO 2004/065218 | 8/2004 |

* cited by examiner

PRE-STACKED OPTICAL FILMS WITH ADHESIVE LAYER

BACKGROUND OF THE INVENTION

The present invention relates to optical displays. In particular, the present invention relates to pre-stacked optical films for assembly into an optical display.

Optical displays, such as backlit liquid crystal displays (LCDs), are used in a wide variety of applications including mobile telephones, personal digital assistants (PDAs), electronic games, laptop computers, monitors, and television screens. Optical films are stacked within an optical display in order to enhance brightness and improve display performance without sacrificing battery life.

Presently, films used in displays are provided as individual films to display manufacturers. The films include tabs that are useful in orienting and positioning the films, and cover sheets to protect the surfaces of the films. During assembly of a display, the cover sheets of the films are removed, and the films are stacked, one by one, into a frame that fits between a backlight assembly and an LCD panel. Double-coated rim tape is placed over the stacked films, which seals the edges of the films. A cover sheet is then placed over the rim tape. To finish the display, the cover sheet is removed, and the LCD panel is adhered to the rim tape.

This process is difficult and costly in terms of time and material. Creating tabs on the films increases the amount of waste material that is produced and increases the width of the bezel, or edge, that must extend around the perimeter of the display to cover the tab. Because the tabs extend to the edge of the rim tape, a path is created that allows debris to enter and settle between the films. Removing cover sheets from individual films increases assembly time and the possibility of damaging the films. In addition, as optical films become thinner and thinner, it becomes increasingly difficult to handle an individual optical film. Thus, resolving these problems would increase product output by increasing assembly efficiency and reducing the number of damaged films.

BRIEF SUMMARY OF THE INVENTION

The present invention is an optical subassembly for use in an optical display that includes a plurality of stacked optical films and an adhesive layer. The adhesive layer contacts the uppermost and lowermost films of the stack to hold the stack as a unit, so that the stack can be assembled into an optical display without individual handling of the optical films of the stack.

DETAILED DESCRIPTION

Figure 1A:
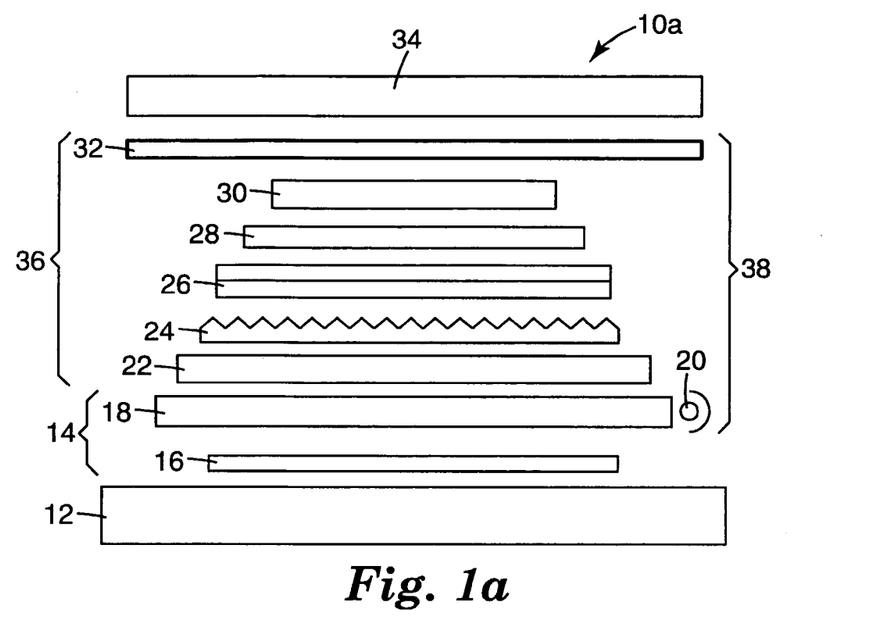
FIGS. 1a-1c are exploded views of representative embodiments of optical displays.

FIG. 1a shows a schematic diagram of optical display 10a, which is not drawn to scale. Optical display 10a includes chassis 12; backlight unit 14 with reflector 16, light guide 18, and light source 20; diffuser 22; prismatic films 24 and 26; diffuser 28; reflective polarizer 30; adhesive layer 32; display panel 34; optical film unit 36 (formed by elements 22-32); and optical film package 38 (formed by optical film unit 36 and light guide 18).

Chassis 12 is typically a plastic frame for supporting components of optical display 10. In this embodiment, backlight unit 14 includes one or more layers of reflector 16, along with light guide 18, and light source 20. Light guide 18 may include special features for directing light and can take the form of a slab as shown or other forms such as a wedge.

Light source 20 may be any suitable type of light source such as a fluorescent lamp, light emitting diodes, or direct lit. Light from light source 20 is directed toward display panel 34 via light guide 18.

Next, diffuser 22 is stacked onto light guide 18. Diffuser 22 homogenizes the intensity of the light from light guide 18.

Prismatic films 24 and 26 are stacked onto diffuser 22. Films 24 and 26 contain arrays of prisms for directing light toward display panel 34. Relative to each other, films 24 and 26 may be arranged such that their prism arrays run parallel, or more typically, the prism arrays run non-parallel. As shown in this embodiment, the prism arrays run perpendicular relative to each other.

Diffuser 28 is stacked onto prismatic film 26. Diffuser 28 is typically a relatively weak diffuser and, as described in regard to diffuser 22, homogenizes the light intensity so that it is more uniform.

The last film shown stacked is reflective polarizer 30. Reflective polarizer 30 may be any of a number of types of reflective polarizers including a multi-polymer film, a cholesteric polarizer, or a wire-grid polarizer. Reflective polarizer 30 recycles light that is in the wrong polarization state and will not be transmitted as image light.

Typically, reflective polarizer 30 is laminated to the back of panel 34. However, as in the case shown here and in the following embodiments, reflective polarizer 30 may be stacked with the other layers.

The next layer is adhesive layer 32 (in bold). Adhesive layer 32 is typically double-coated rim tape or shading frame, but it may also be an adhesive coating. One surface of adhesive layer 32 is black and contacts display panel 34. The opposite surface is colored white or silver and contacts a portion of each of the layers underneath it. Light tends to leak around the film layers, and the reflective surface of adhesive layer 32 recycles the leaked light for redirection. The black surface reduces a "halo effect" around the optical display, which is a bright line that sometimes forms along its perimeter. Suitable rim tapes that may be used include 3M Company's Black and White Double Coated Polyester Tape 4003S, 4003T, 4007, 4037, and 4040 and Black and Silver Double Coated Polyester Tape 5173. If desired, 3M Company's Black and White Single Coated Polyester Tape 4038 and 4039 may also be used.

It should be noted that layers 22 through 30 represent one embodiment. Depending on needs and desires, some of layers 22 through 30 may be omitted, added to, or substituted. For example, a turning film with its prisms facing either up or down may replace prismatic films 24 and 26, or a Vikuiti BEF-RP 90/24 reflective polarizer with prisms may be added. In addition, each layer becomes progressively smaller, and their edges or perimeters are serially recessed such that portions of the layers contact adhesive layer 32, which will be explained in more detail below.

Adhesive layer 32 may contact layers 22 through 30 to form optical film unit 36. Alternatively, adhesive layer 32 may additionally contact light guide 18 to form optical film package 38. Optical film unit 36 and optical film package 38 may be referred to as optical subassemblies. Unit 36 and package 38 are assembled prior to delivery to a manufacturer for assembly of optical display 10. The layers are pre-aligned, so no tabs are needed. Adhesive layer 32 seals the edges of the layers, which removes any entry point for debris. However, as will be shown below, it is unnecessary for adhesive layer 32 to completely circumscribe the perimeters of the included layers.

Figure 1B:
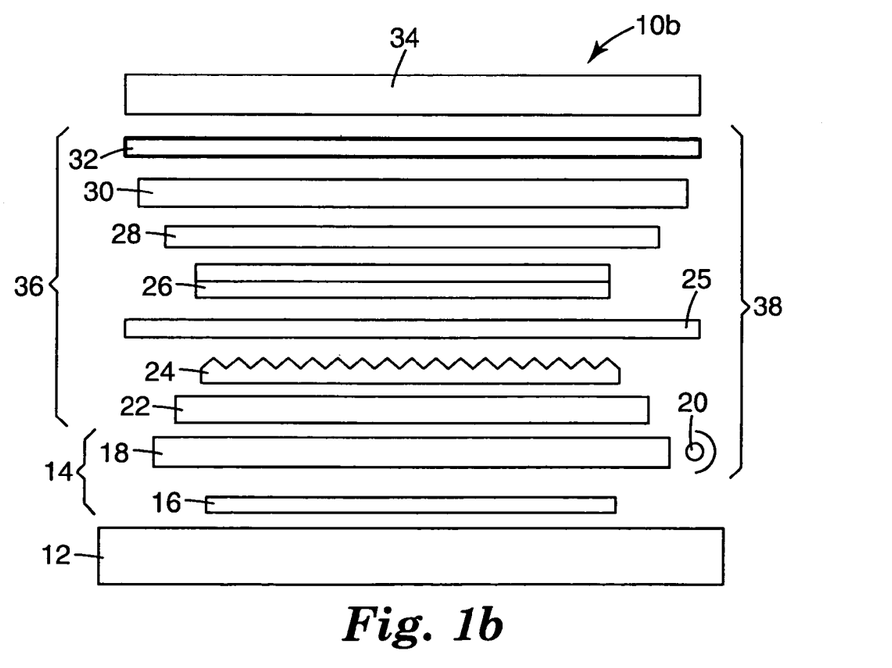

FIG. 1b is a schematic diagram of optical display 10b. Display 10b includes the same layers as display 10a but additionally includes adhesive layer 25.

Light guide 18, diffuser 22, and prismatic film 24 become serially smaller as previously shown. Adhesive layer 25 is stacked onto prismatic film 24 and sized similarly to adhesive layer 32 such that one surface of adhesive layer 25 contacts and secures each of layers 18 through 24 or 22 through 24. Next, prismatic film 26, diffuser 28, and reflective polarizer 30 are stacked. Instead of continuing to decrease in size as in FIG. 1a, however, each layer becomes serially larger. Adhesive layer 32, which is sized identically to that shown for display 10a, is then stacked onto reflective polarizer 30. The remaining surface of adhesive layer 25 contacts layers 26 through 32.

Adhesive layer 25, unlike adhesive layer 32 is not rim tape but is any type of suitable double-coated tape. With this embodiment, the layers may be more secure, and the smallest layer of display 10b is larger than the smallest layer of display 10a. Thus, a larger viewing area is provided without increasing the overall size of the layers.

Figure 1C:
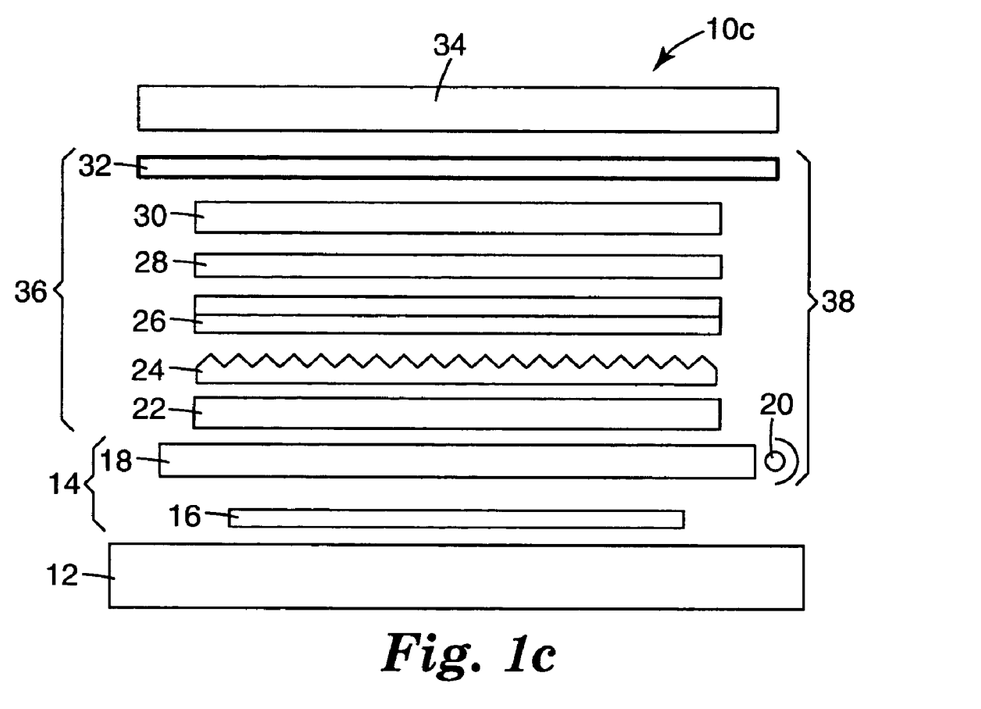

FIG. 1c is a schematic diagram of optical display 10c. Again, display 10c includes the same layers as display 10a.

Here, light guide 18 is larger than layers 22 through 30. Layers 22 through 30 are the same size, and adhesive layer 32 only contacts a portion of light guide 18 and reflective polarizer 30. The remaining layers are trapped between light guide 10 and reflective polarizer 30, and the edges of each layer are sealed to prevent debris from entering.

Note that in order to form unit 36, diffuser 22 would be sized larger than the remaining layers to adhere to adhesive layer 32. As with display 10b, the smallest layers are larger than the smallest layer of display 10a, which provides a larger viewing area without increasing the films' overall size.

Figure 2A:
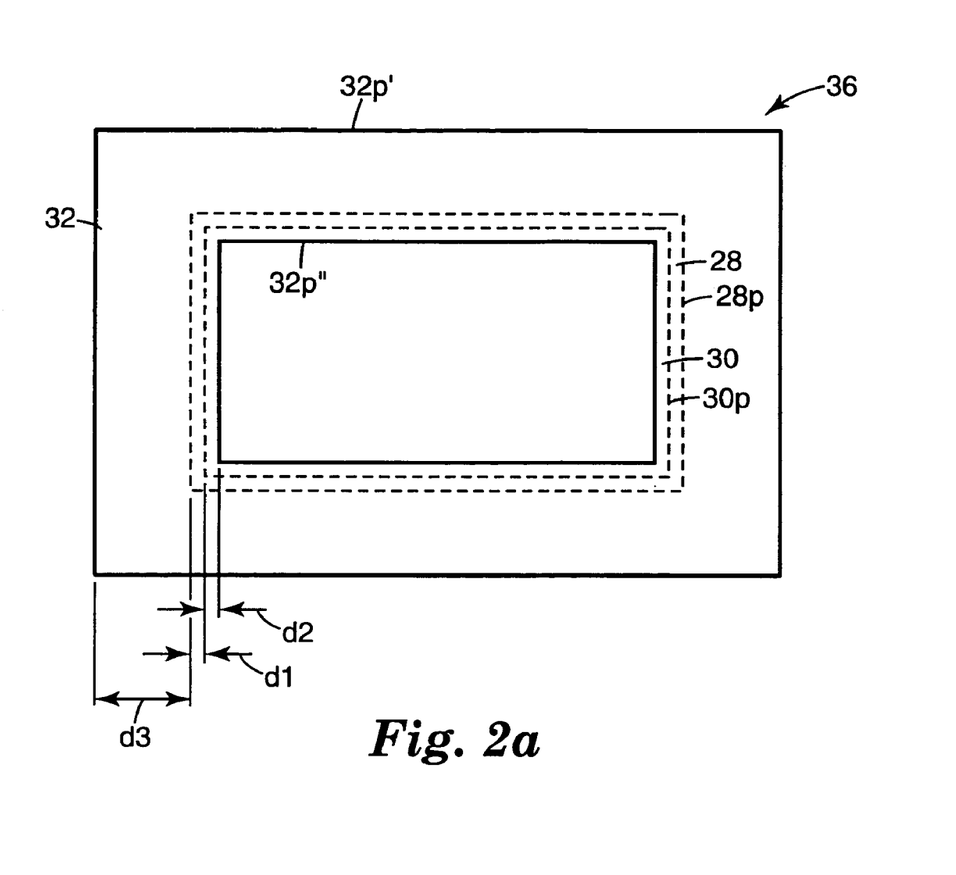
FIGS. 2a and 2b are top and side views of a first representative embodiment of an optical film unit.
Figure 2B:
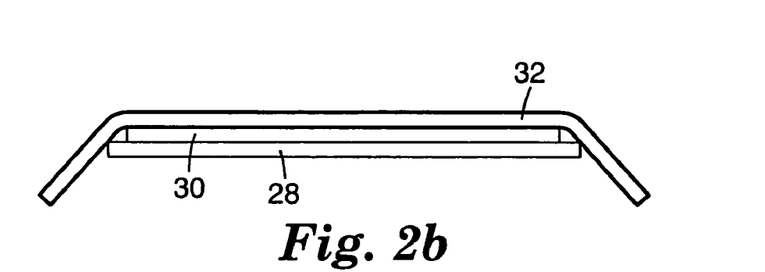

FIGS. 2a and 2b are top and side views, respectively, of optical film unit 36. Unit 36 includes adhesive layer 32 having outer perimeter 32p' and inner perimeter 32p", diffuser 28 having outer perimeter 28p, and reflective polarizer 30 having outer perimeter 30p. Recess distances d1, d2, and d3 are also shown in FIG. 2a. Only two layers, 28 and 30, are shown for simplicity. However, any number and type of film used in managing light for an optical display, such as those described for FIGS. 1a-1c, may be used.

Diffuser 28 is the bottom layer with reflective polarizer 30 being stacked on top. As is evident in FIGS. 2a and 2b, diffuser 28 is larger than reflective polarizer 30, and the films are arranged such that outer perimeter 30p is recessed by distance d1 from outer perimeter 28p.

In this embodiment, adhesive layer 32 has a frame-type shape and is stacked over diffuser 28 and reflective polarizer 30. Inner perimeter 32p" is recessed by distance d2 from outer perimeter 30p, while outer perimeter 32p' extends beyond outer perimeter 28p by distance d3. Thus, a portion of each of diffuser 28 and reflective polarizer 30 contacts and adheres to adhesive layer 32. Ideally, a protective cover sheet (not shown) is stacked over adhesive layer 32 and under the lowermost layer. The cover sheets are removed prior to attaching panel 34 to unit 36 to create a display module. Suitable protective cover sheets and their method of attachment are described in Ser. No. 10/750,553, filed on Dec. 31, 2003.

Distances d1, d2, and d3 are about 2.0 mm or less or, more typically, about 1.0 mm or less. Distances d1-d3 may not be identical to each other and may not be uniform along any of the entire perimeters of the layers.

As evident in FIG. 2b, adhesive 32 must conform to the geometry of the staggered edges of the layers in order to contact a portion of each layer. It is shown exaggerated for purposes of illustration. The films are thin, and adhesive layer 32 would not normally require such a conformation.

Unit 36 is much easier to handle than each film individually and is sealed, which prevents debris from accumulating between films. The films have no tabs, because they are pre-aligned and the manufacturer need only align outer perimeter 32p' within a chassis in order to correctly position optical film unit 36. In addition, tab-less films result in narrower borders around the viewing area. This allows manufacturers to increase the size of the viewing area without increasing the overall size of the device. This is especially significant for small devices such as mobile phones and PDAs.

Figure 2C:
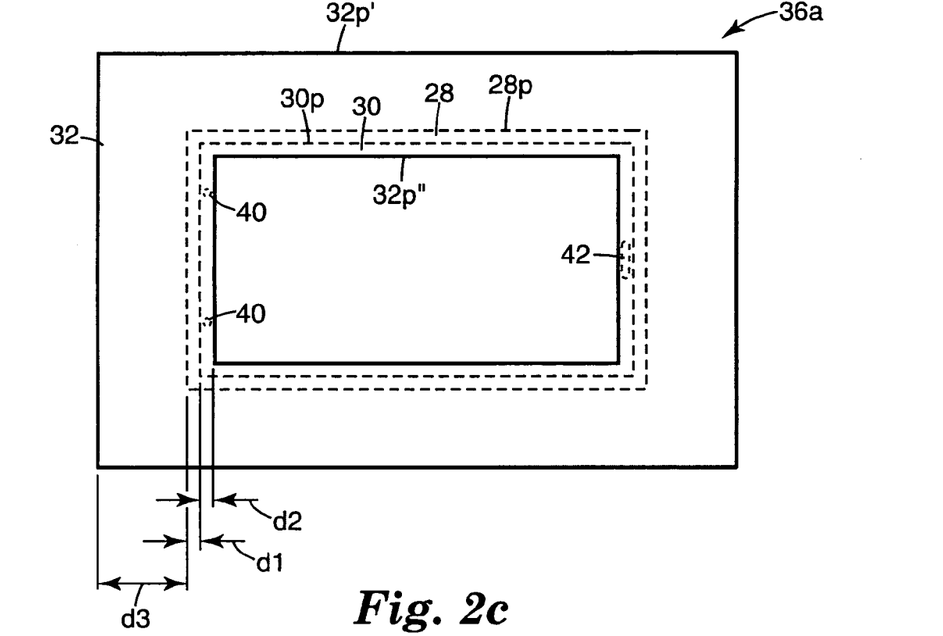
FIGS. 2c and 2d are top views of second and third representative embodiments of an optical film unit.

FIG. 2c is a top view of optical unit 36a, which is similar to unit 36 but includes holes 40 and slots 42 within reflective polarizer 30. Holes 40 may have any of a number of types of shapes such as circles or squares. Although two are shown here, there may be one or more along any portion of or all of outer perimeter 30p. Holes 40 should measure less than about 2 mm across, but will typically measure about 0.5 mm to about 1.0 mm.

Slot 42 is also shown. Slot 42 may have any of a number of elongated shapes such as a rectangle or oval. There may be one or more of slot 42 along outer perimeter 30p and can be in any combination with holes 40. Slot 42 may have any length, but its width should be less than 2 mm, typically between about 0.5 mm and 1.0 mm.

Holes 40 and slot 42 should be about 0.50 mm or less from outer perimeter 30p and inner perimeter 32p". Typically, additional layers sized the same as reflective polarizer 30 and also having holes 40 and/or slot 42 would be included. Only the lowermost layer is sized larger and does not include holes 40 or slot 42. Thus, each of the layers is secured and sealed from entry of any debris.

The use of slot 42 secures the layers as a unit, but also allows some movement of the layers in the direction of the width of slot 42. Thus, this embodiment may better tolerate any adjustments between the layers should it be necessary.

Figure 2D:
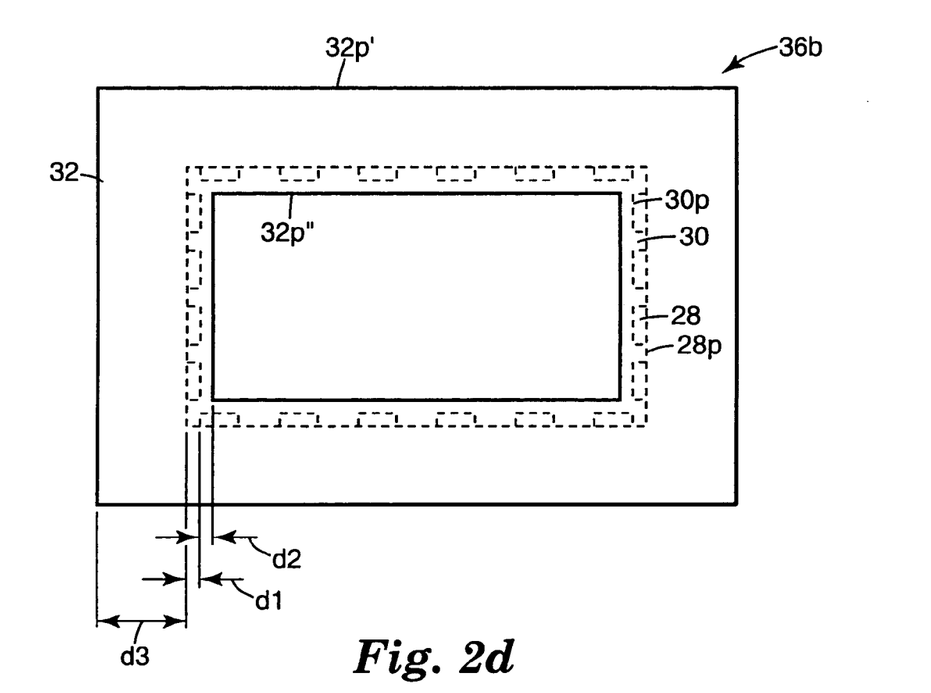

FIG. 2d is a top view of optical unit 36b, which is also similar to unit 36 but includes notches 30n on reflective polarizer 30. Here, outer perimeter 30p extends out to outer perimeter 28p except where notches 30n are recessed by distance d1. There may be any number notches 30n having any size along outer perimeter 30p. Notches 30n may have any type of shape such as, for example, a triangular shape, and it is not necessary that perimeter 30p extend out to outer perimeter 28p.

Figure 3A:
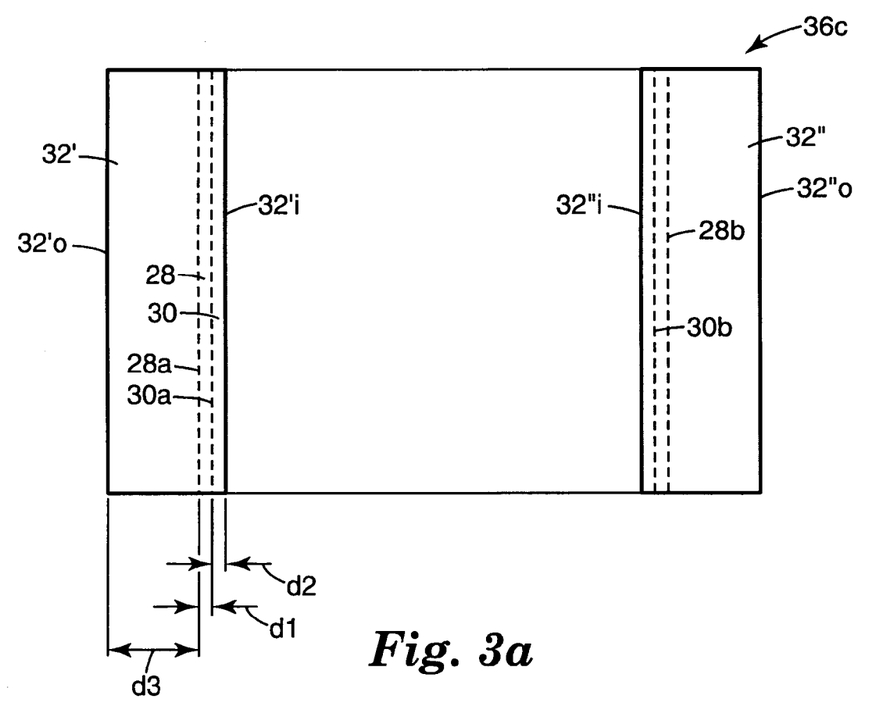
FIGS. 3a and 3b are top and side views of a fourth representative embodiment of an optical film unit.
Figure 3B:
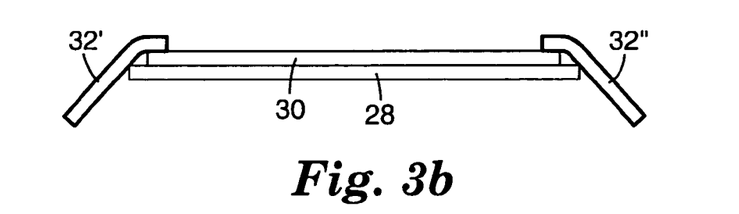

FIGS. 3a and 3b are top and side views, respectively, of optical film unit 36c. Unit 36c includes diffuser 28 having edges 28a and 28b, reflective polarizer 30 having edges 30a and 30b, adhesive layer 32' having outer edge 32'o and inner edge 32'i, and adhesive layer 32" having outer edge 32"o and inner edge 32"i. Recessed distances d1, d2, and d3 are also included. Edge 28a is opposite edge 28b, and likewise, edge 30a is opposite edge 30b.

Unlike the embodiment of unit 36, the full perimeter of the films and adhesive layer are not staggered relative to one another. In addition, the adhesive layer is in the form of only a portion of a frame-type shape. Edges 30a and 30b are recessed from edges 28a and 28b, respectively, by distance d1. Edges 32'i and 32"i are recessed from edges 30a and 30b, respectively, by distance d2. Edges 32'o and 32"o extend beyond edges 28a and 28b, respectively, by distance d3. Again, distances d1-d3 need not be identical to each other or uniform along each edge.

Though unit 36c has two remaining edges of each layer that are not staggered and have no adhesive layer, unit 36c is still assembled and installed as a unit. The advantage is that a device into which it is installed will require only a minimal bezel to cover the two remaining edges. Thus, unit 36c provides a maximum viewing area in one dimension.

Any two edges along the perimeters of diffuser 28 and reflective polarizer 30 may be staggered and secured with adhesive layers 32' and 32". In addition, it may be desirable to stagger and secure a third edge of unit 36c.

Figure 3C:
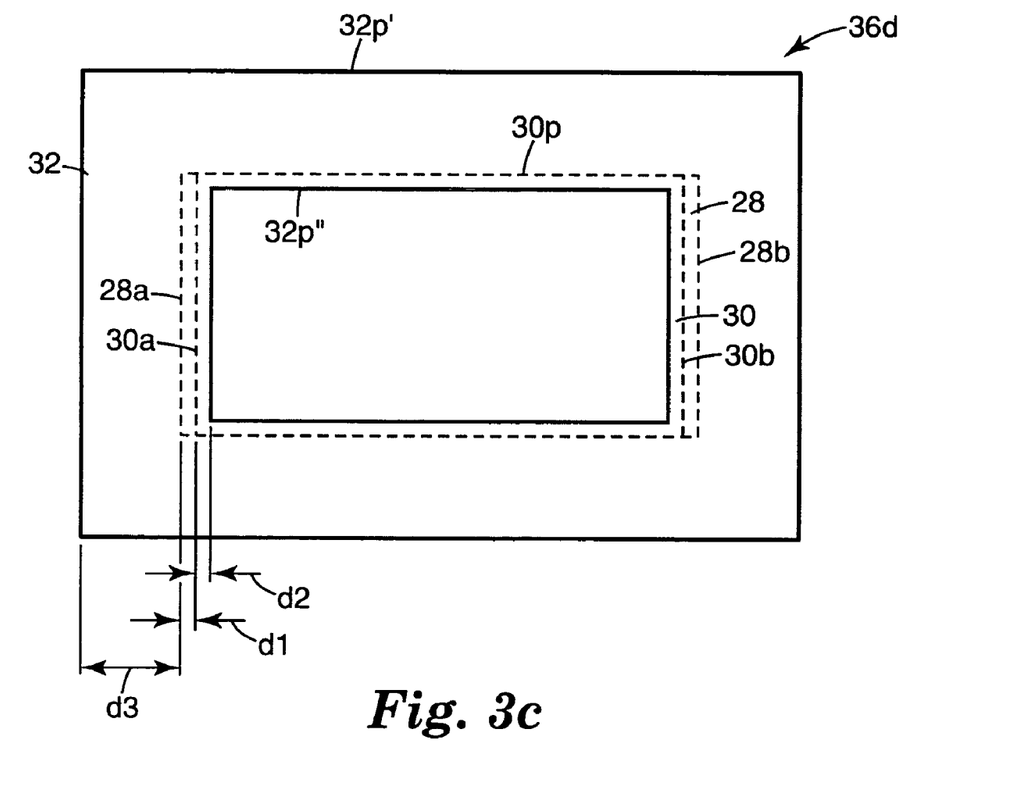
FIG. 3c is a top view of a fifth representative embodiment of an optical film unit.

FIG. 3c is a top view of optical unit 36d, which is similar to unit 36c but includes adhesive layer 32 and shows outer perimeter 30p. Here, adhesive layer 32 has a frame-type shape that extends around the entire perimeter of the layers. Edges 28a and 30a are staggered relative to each other, and edges 28b and 30b are also staggered relative to each other as shown in unit 36c. The remaining two edges of films 28 and 30 are not staggered, and inner perimeter 32p" is recessed from outer perimeter 30p by distance d2. The remaining edges of diffuser 28 do not contact adhesive layer 32.

Unit 36d also maximizes the viewing area in one dimension. In addition, additional layers may be added between films 28 and 30 that are sized the same as reflective polarizer 30 giving a configuration similar to that shown in FIG. 1c.

Figure 4A:
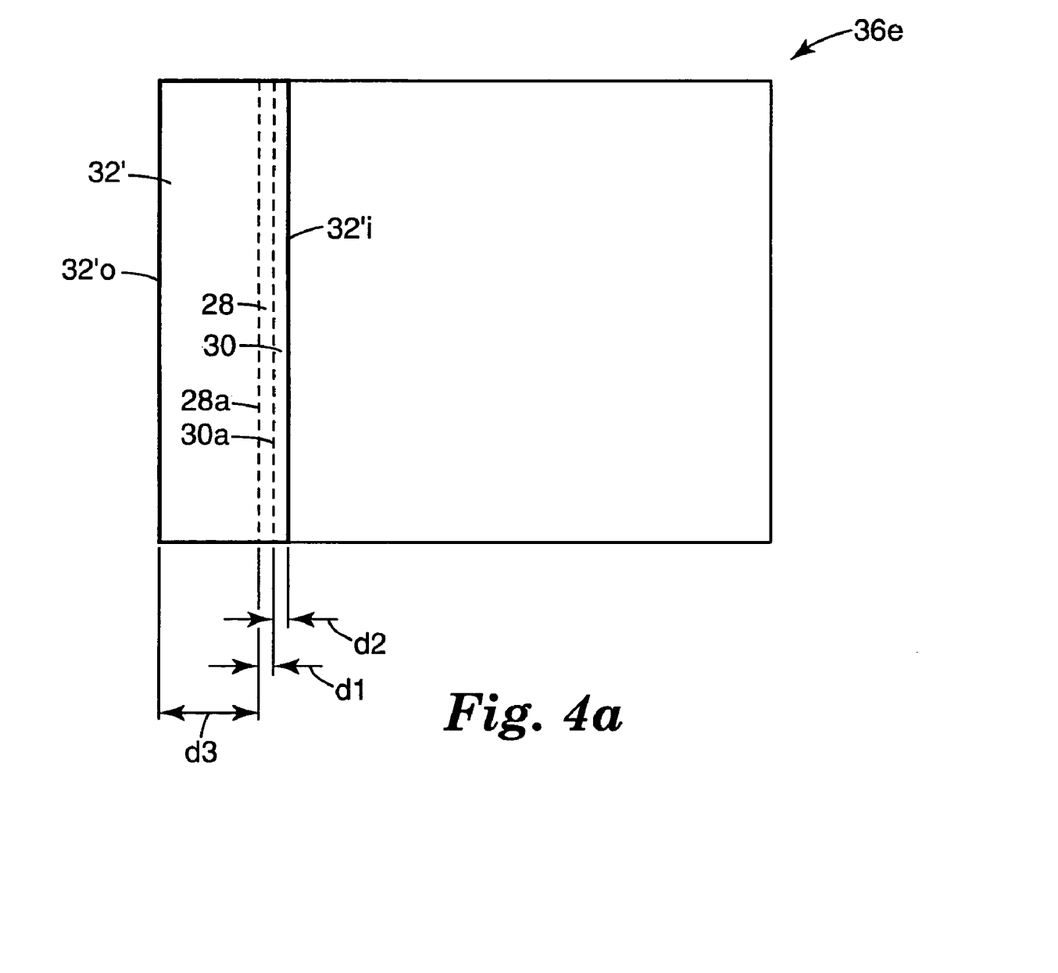
FIGS. 4a and 4b are top and side views of a sixth representative embodiment of an optical film unit.
Figure 4B:
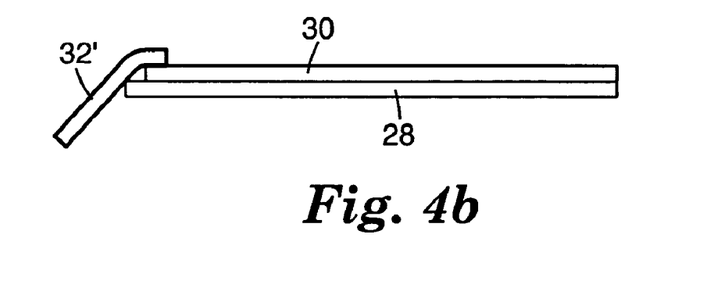

FIGS. 4a and 4b are top and side views of optical film unit 36e. Unit 36e includes diffuser 28 having edge 28a, reflective polarizer 30 having edge 30b, and adhesive layer 32' having outer edge 32'o and inner edge 32'i. Again, recessed distances d1, d2, and d3 are shown.

In this embodiment, only one edge is secured. Diffuser 28 is at the bottom of the stack followed by reflective polarizer 30 and then adhesive layer 32'. Edge 30a is recessed from edge 28a by distance d1. Edge 32'i is recessed from edge 30a by distance d2. Edge 32'o extends beyond edge 28a by distance d3. The advantages of unit 36e are that unit 36e is still handled as a unit instead of as single films, but if necessary, the films may be fanned out in order to remove any debris that may settle between the films.

Figure 4C:
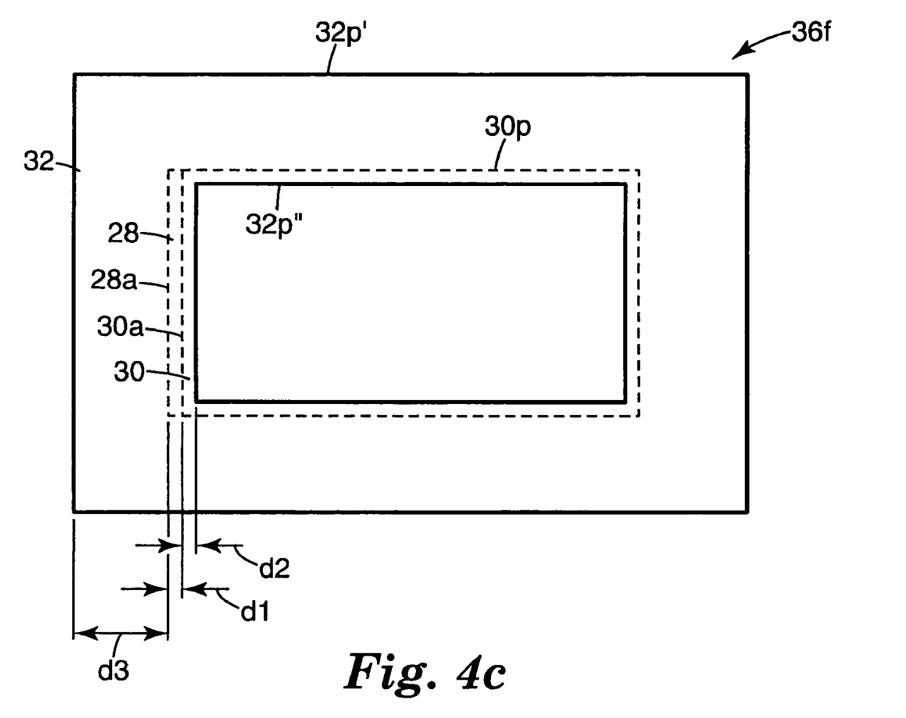
FIG. 4c is a top view of a seventh representative embodiment of an optical film unit.

FIG. 4c is a top view of optical unit 36f, which is similar to unit 36e but includes adhesive layer 32 and outer perimeter 30p. Edges 28a and 30a are staggered relative to each other. The remaining edges are not staggered, and inner perimeter 32p" is recessed from outer perimeter 30p by distance d2. The remaining edges of diffuser 28 do not contact adhesive layer 32.

Additional layers may also be added to any of the previous embodiments. For example, additional film layers and an additional adhesive layer such as shown in FIG. 1b may be combined with the embodiment of unit 36f. In this example, only one edge of each layer would be serially staggered. In all embodiments, recessed distances d1-d3 are typically 2.0 mm, but preferably 1.0 mm or less.

The films and adhesive layers shown in these embodiments can have any geometric shape, including circular and oval shapes. In addition, these embodiments also apply to optical film package 38 (FIGS. 1a-1c) simply by adding a light guide to the bottom of the plurality of stacked films.

Figure 5:
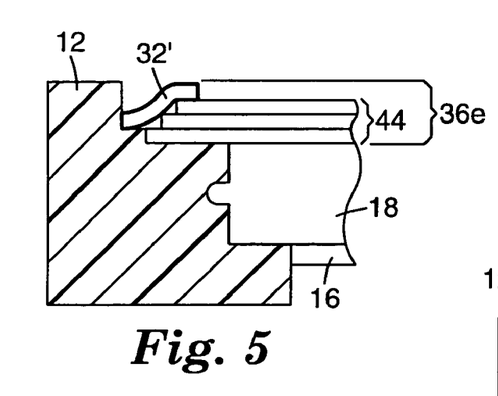
FIG. 5 is a cross-sectional view of an optical film unit installed in a chassis.

FIG. 5 shows optical film unit 36e as assembled into chassis 12, which are not drawn to scale. FIG. 5 includes chassis 12, reflector 16, light guide 18, and unit 36c with adhesive layer 32' and plurality of stacked optical films 44. Films 44 are shown having three films, but it may include any number of films such as those shown in and described in reference to FIGS. 1a-1c.

Light guide 18 is attached to chassis 12. Unit 36e is installed by positioning the edge of adhesive layer 32' within chassis 12. Adhesive layer 32' adheres to chassis 12 to secure unit 36e. As shown in FIG. 5, adhesive layer 32' must conform to the geometry of the staggered layers and attachment to chassis 12.

Figure 6:
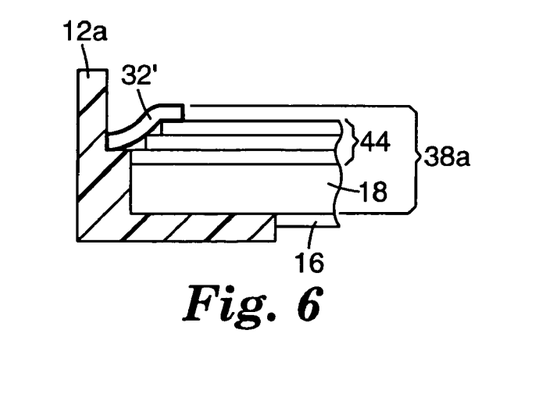
FIG. 6 is a cross-sectional view of an optical film package installed in a chassis.

FIG. 6 shows optical film package 38a as assembled into chassis 12a, which are not drawn to scale. FIG. 6 includes chassis 12a, reflector 16, and package 38a with light guide 18a, adhesive layer 32', and plurality of stacked optical films 44.

In this embodiment, package 38a is installed by positioning adhesive layer 32' within chassis 12a. Chassis 12 and chassis 12a and light guides 18 and 18a are slightly different to accommodate installation of an optical film unit or an optical film package, respectively. Again, adhesive layer 32' conforms to the geometry needed to contact portions of light guide 18a, optical films 44, and chassis 12a.

The present invention provides a more efficient and less costly product for installation into an optical display. The optical layers may be pre-aligned and stacked in bulk by means of a continuous web, which is more efficient and effective than stacking each layer individually as is presently done. Because the layers are not individually stacked, they no longer require peripheral tabs for positioning and orienting nor protective cover sheets. In addition, the films may be sealed to prevent any debris from entering between the layers.

Although the present invention has been described with reference to preferred embodiments, workers skilled in the art will recognize that changes may be made in form and detail without departing from the spirit and scope of the invention.

The invention claimed is:

1. An optical display comprising:
   a backlight unit;
   a display panel unit; and
   an optical film unit positioned between the backlight unit and the display panel unit, the optical film unit comprising a plurality of pre-aligned stacked optical films, wherein at least an uppermost optical film of the stack and a lowermost optical film of the stack contact an adhesive layer, wherein the adhesive layer secures the optical film unit to the display panel unit.

2. The optical display of claim 1 wherein the backlight unit further comprises:
   a light guide; and
   at least one light source.

3. The optical display of claim 1 wherein the adhesive layer seals edges of the optical film unit such that there is no entry point for debris.

4. An optical display comprising:
   a backlight unit;
   a display panel unit; and
an optical film unit positioned between the backlight unit and the display panel unit, the optical film unit comprising a plurality of pre-aligned stacked optical films, wherein at least an uppermost optical film of the stack and a lowermost optical film of the stack contact an adhesive layer wherein the optical films each include at least one edge, which are serially recessed by distances.

5. The optical display of claim 4 wherein the distances are about 2.0 mm or less.

6. The optical display of claim 4 wherein the distances are about 1.0 mm or less.

7. An optical film package comprising:
   a light guide having a first perimeter;
   an optical film unit comprising:
      a plurality of stacked optical films, each optical film having a perimeter, the plurality of stacked optical films including first and second exterior optical films, the first exterior optical film being adjacent the light guide, at least a portion of a perimeter of the first exterior optical film being recessed from the first perimeter of the light guide such that a portion of the light guide is exposed, at least portions of perimeters of each remaining optical film being recessed such that a portion of at least the second exterior optical film is exposed; and
   an adhesive layer having a second perimeter extending beyond the first perimeter of the light guide, the adhesive layer contacting the exposed portions of the optical films and light guide.

8. The optical film package of claim 7 wherein the adhesive layer has a frame shape.

9. The optical film package of claim 7 wherein the adhesive layer has a portion of a frame shape.

10. The optical film package of claim 7 wherein the plurality of stacked optical films are pre-aligned.

11. An optical subassembly for use in an optical display, the optical subassembly comprising:
    a plurality of stacked optical films having an uppermost film and a lowermost film; and
    a first adhesive layer contacting the uppermost and lowermost films of the stack to hold the stack together as a unit, so that the stack can be assembled into an optical display without individual handling of the optical films of the stack, wherein at least one optical film includes voids to allow the first adhesive layer to contact the lowermost film.

12. The optical subassembly of claim 11 and further comprising:
    at least one intermediate film between the uppermost and lowermost films of the stack.

13. The optical subassembly of claim 12 wherein edges of the optical films are staggered and further comprising:
    a second adhesive layer between two adjacent films of the stack.

14. The optical subassembly of claim 12 wherein the optical films are configured such that each optical film contacts the first adhesive layer.

15. The optical subassembly of claim 14 wherein edges of the optical films and the first adhesive layer are staggered.

16. The optical subassembly of claim 1 wherein at least a portion of a perimeter of at least one optical film is shaped to allow the first adhesive layer to contact the lowermost film.

17. The optical subassembly of claim 11 and further comprising:
    a light guide stacked under the lowermost film which is configured to allow the first adhesive layer to contact the light guide.

* * * * *